United States Patent
Morales et al.

(10) Patent No.: US 8,462,174 B2
(45) Date of Patent: Jun. 11, 2013

(54) SMART COLOR BARS

(75) Inventors: Javier A. Morales, Irondequoit, NY (US); Michael E. Parrell, Ontario, NY (US)

(73) Assignee: Xerox Corporation, Norwalk, CT (US)

( * ) Notice: Subject to any disclaimer, the term of this patent is extended or adjusted under 35 U.S.C. 154(b) by 1522 days.

(21) Appl. No.: 11/714,593

(22) Filed: Mar. 5, 2007

(65) Prior Publication Data

US 2008/0222526 A1    Sep. 11, 2008

(51) Int. Cl.
*G09G 5/02*    (2006.01)

(52) U.S. Cl.
USPC .......................... 345/593; 715/276

(58) Field of Classification Search
USPC .......................... 345/593; 715/276
See application file for complete search history.

(56) References Cited

U.S. PATENT DOCUMENTS

| | | | |
|---|---|---|---|
| 5,822,503 A * | 10/1998 | Gass et al. ..................... | 358/1.9 |
| 6,624,908 B1 * | 9/2003 | Petchenkine et al. ........ | 358/1.15 |
| 6,721,068 B2 | 4/2004 | Weiss ............................. | 358/1.9 |
| 2004/0264773 A1 | 12/2004 | Doumoto et al. ............. | 382/167 |
| 2006/0001665 A1 * | 1/2006 | Kupersmit .................... | 345/426 |
| 2006/0177242 A1 | 8/2006 | Proper et al. ................. | 399/266 |
| 2006/0227354 A1 | 10/2006 | Farrell et al. ................. | 358/1.13 |
| 2006/0250629 A1 | 11/2006 | Morales et al. .............. | 358/1.13 |
| 2007/0002342 A1 | 1/2007 | Morales et al. ............... | 358/1.9 |
| 2007/0091336 A1 * | 4/2007 | Abad Peiro et al. ........... | 358/1.9 |
| 2007/0097464 A1 * | 5/2007 | Nielsen et al. ................ | 358/518 |

* cited by examiner

*Primary Examiner* — Maurice L McDowell, Jr.
(74) *Attorney, Agent, or Firm* — Luis M. Ortiz; Kermit D. Lopez; Tuesday A. Kaasch

(57) ABSTRACT

A computer implemented method and system for enhancing color bars utilized in color rendering applications. One or more primary color bars are associated with an electronic document in response to at least one input by a user, wherein the primary color bar(s) is based on a plurality of input color spaces utilized by the electronic document. Additionally, a dynamic color bar can be automatically configured that includes a plurality of spot colors associated with the electronic document, wherein the dynamic color bar permits the user to determine all spot colors defined for the electronic document. The primary color bar(s) permits a single set of rules for color bar content and placement to be governed by the primary color bar, thereby enhancing the use of color bars in color rendering applications.

13 Claims, 4 Drawing Sheets

SMART COLOR BARS

TECHNICAL FIELD

Embodiments are generally related to data-processing methods and systems. Embodiments are also related to rendering devices, techniques and image-processing methods and systems. Embodiments are further related to color rendering technology. Embodiments are additionally related to color bars utilized in color rendering.

BACKGROUND OF THE INVENTION

Color bars are often employed in digital rendering applications such as printing. Color bars are pressmarks that are used to ensure some minimal check on color integrity. A color bar is often provided in the form of a graphically displayed horizontal and/or vertical strip located at the top or bottom of design menus and are used to assign colors to elements and certain styles. A color bar may show the color chips associated with a current color set in a user palette and can also include various user input buttons or icons for changing colors.

In graphical user interface display environments, for example, color bars are typically implemented as a series of small squares that represent all the colors in a job. For the most part, color bars contain four boxes representing C (Cyan), M (Magenta), Y (Yellow) and K (Black) and/or variations thereof. C, M, Y and K constitute the basic colors involved in color rendering applications. If jobs contain spot colors in addition to CMYK, color bars can be modified to include these spot colors as well.

Traditionally, these spot color swatches are defined one job at a time. Products such as, for example, EFI One Flow, include "dynamic" color bars that can be defined once and used in a variety of jobs. The user may define a swatch to contain Spot1, Spot2, etc. and the system will define those swatches with spot colors found in the job. While this is a great advancement in productivity for offset, it falls short of the requirements for digital printing.

Accordingly a need exists for enhancing the functionality of color bars because the traditional swatch method does not handle a variable number of spot colors and also does not handle multiple color spaces in the input document.

BRIEF SUMMARY

The following summary is provided to facilitate an understanding of some of the innovative features unique to the embodiments disclosed and is not intended to be a full description. A full appreciation of the various aspects of the embodiments can be gained by taking the entire specification, claims, drawings, and abstract as a whole.

It is, therefore, one aspect of the present invention to provide for an improved color rendering technology.

It is another aspect of the present invention to provide for an improved image-processing method and system.

It is a further aspect of the present invention to provide a method and system for enhancing the functionality of color bars utilized in color document rendering.

The aforementioned aspects and other objectives and advantages can now be achieved as described herein. A computer implemented method, system and program product are disclosed for enhancing color bars utilized in color rendering applications. One or more primary color bars are associated with an electronic document in response to at least one input by a user, wherein the primary color bar(s) is based on a plurality of input color spaces utilized by the electronic document. Additionally, a dynamic color bar can be automatically configured that includes a plurality of spot colors associated with the electronic document, wherein the dynamic color bar permits the user to determine all spot colors defined for the electronic document. The primary color bar(s) permits a single set of color rendering rules to be governed by the primary color bar, thereby enhancing the use of color bars in color rendering applications.

An enhancement to "dynamic" color bars is thus provided, which achieves the functionality required for digital color rendering device. Specifically, the disclosed embodiments add functionalities that support a variable number of color spots and color spaces. Two primary mechanisms achieve these features. First, adding rules are added that guide the construction of color bars with a variable number of spot colors. Second, rules are also added, which govern the type of "baseline" color bars that appear based on the color spaces used in an input document.

Specification of rules for content placement relative to an area determined during execution allows a single set of rules to apply to a wide variety of document dimensions. This is a key enabler for automation as it allows simplification of workflows. The "primary color bars" serve as a simple-to-use "pre-flight" report so that the user can view at a glance the color spaces used in a particular rendering job (and additionally redirect the job to the proper queue) without having to pre-flight the job. Creating color bars with all the defined spot colors permits the operator to determine whether spots have been defined and that the DFE (Digital Front End) recognizes the spot color call-out. Such features can serve as a very simple "pre-flight" operation for inexperienced operators. The dynamic color bar therefore provides for a simple mechanism that permits an operator-user to measure colorimetric values for all spot colors in an electronic and renderable document.

BRIEF DESCRIPTION OF THE DRAWINGS

The accompanying figures, in which like reference numerals refer to identical or functionally-similar elements throughout the separate views and which are incorporated in and form a part of the specification, further illustrate the embodiments and, together with the detailed description, serve to explain the embodiments disclosed herein.

DETAILED DESCRIPTION

The particular values and configurations discussed in these non-limiting examples can be varied and are cited merely to illustrate at least one embodiment and are not intended to limit the scope thereof.

Figure 1:
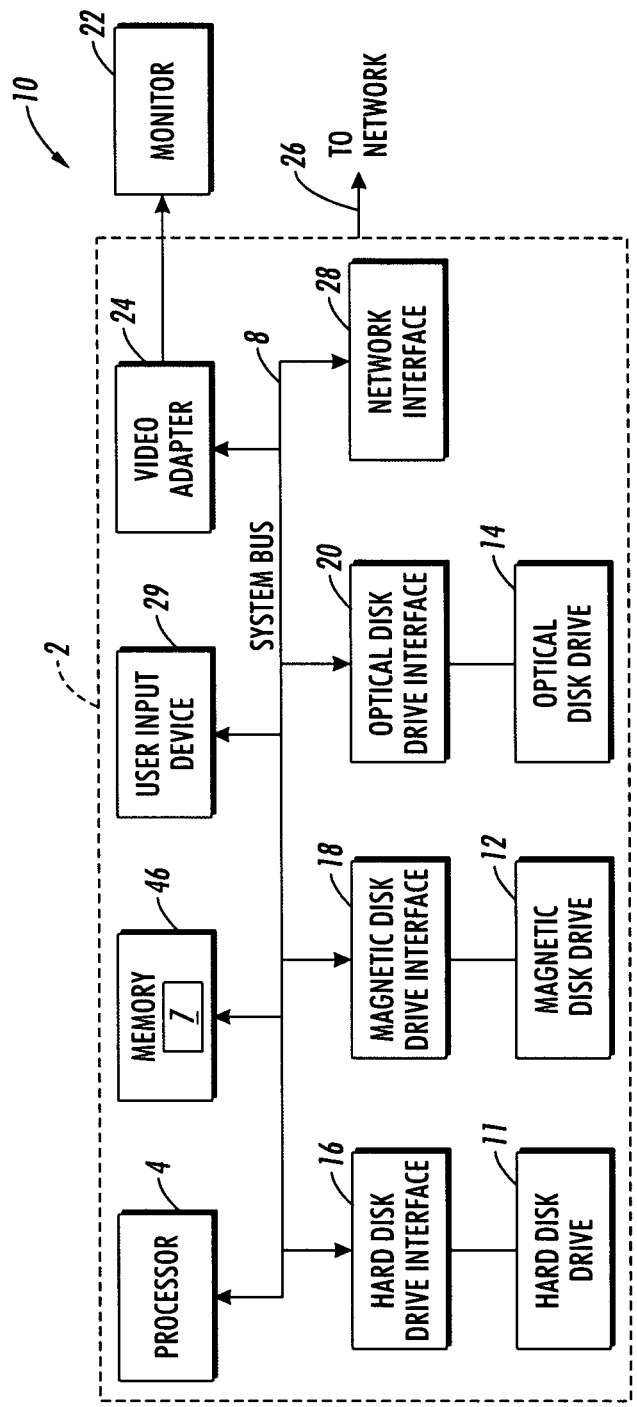
FIG. 1 illustrates a block diagram of a data-processing apparatus, which can be adapted for use in implementing a preferred embodiment.

FIG. 1 illustrates a block diagram of a data-processing apparatus 10, which can be adapted for use in accordance with a preferred embodiment. Data-processing apparatus 10 can be configured to include a general purpose computing device, such as a computer 2. The computer 2 includes a processing unit 4, a memory 6, and a system bus 8 that operatively couples the various system components to the processing unit 4. One or more processing units 4 operate as either a single central processing unit (CPU) or a parallel processing environment. Data-processing apparatus 10 represents only one of many possible data-processing devices or systems for implementing embodiments. Data-processing apparatus 10 can be provided as a stand-alone personal computer, portable/laptop computer, PDA (personal digital assistant), server, mainframe computer, and so forth.

The data-processing apparatus 10 generally includes one or more data storage devices for storing and reading program and other data. Examples of such data storage devices include a hard disk drive 11 for reading from and writing to a hard disk (not shown), a magnetic disk drive 12 for reading from or writing to a removable magnetic disk (not shown), and an optical disc drive 14 for reading from or writing to a removable optical disc (not shown), such as a CD-ROM or other optical medium. A monitor 22 is connected to the system bus 8 through an adapter 24 or other interface. Additionally, the data-processing apparatus 10 can include other peripheral output devices (not shown), such as speakers and printers. For example, a user input device 29, such as a mouse, keyboard, and so forth, can be connected to system bus 8 in order to permit a user to enter data to and interact with data-processing apparatus 10.

The hard disk drive 11, magnetic disk drive 12, and optical disc drive 14 can be connected to the system bus 8 by a hard disk drive interface 16, a magnetic disk drive interface 18, and an optical disc drive interface 20, respectively. These drives and their associated computer-readable media provide nonvolatile storage of computer-readable instructions, data structures, program modules, and other data for use by the data-processing apparatus 10. Note that such computer-readable instructions, data structures, program modules, and other data can be implemented as a module or group of modules, such as, for example, module 7, which can be stored within memory 6.

Note that the embodiments disclosed herein can be implemented in the context of a host operating system and one or more module(s) 7. In the computer programming arts, a software module can be typically implemented as a collection of routines and/or data structures that perform particular tasks or implement a particular abstract data type. Module 7 can, for example, implement the methods 200, 300, 400 described and illustrated herein with respect to FIGS. 2, 3 and 4.

Software modules generally comprise instruction media storable within a memory location of a data-processing apparatus and are typically composed of two parts. First, a software module may list the constants, data types, variable, routines and the like that can be accessed by other modules or routines. Second, a software module can be configured as an implementation, which can be private (i.e., accessible perhaps only to the module), and that contains the source code that actually implements the routines or subroutines upon which the module is based. The term module, as utilized herein can therefore refer to software modules or implementations thereof. Such modules can be utilized separately or together to form a program product that can be implemented through signal-bearing media, including transmission media and recordable media.

It is important to note that, although the embodiments are described in the context of a fully functional data-processing apparatus such as data-processing apparatus 10, those skilled in the art will appreciate that the mechanisms of the present invention are capable of being distributed as a program product in a variety of forms, and that the present invention applies equally regardless of the particular type of signal-bearing media utilized to actually carry out the distribution. Examples of signal-bearing media include, but are not limited to, recordable-type media such as CD ROMs, flash memory USB drives, DVDs and the like. Examples of signal-bearing media also include transmission-type media such as analogue or digital communications links. Module 7, for example, can be executed by the data-processing apparatus 10, such that the module 7 (or a group of such modules) and the data-processing apparatus 10 are operable in combination with one another to perform the various instructions and logical operational steps of methods 200, 300, 400 respectively described and illustrated herein with respect to FIGS. 2, 3, and 4.

Any type of computer-readable media that can store data that is accessible by a computer, such as magnetic cassettes, flash memory cards, digital versatile discs (DVDs), Bernoulli cartridges, random access memories (RAMs), and read only memories (ROMs) can be used in connection with the embodiments.

A number of program modules can be stored or encoded in a machine readable medium such as the hard disk drive 11, the, magnetic disk drive 12, the optical disc drive 14, ROM, RAM, etc or an electrical signal such as an electronic data stream received through a communications channel. These program modules can include an operating system, one or more application programs, other program modules, and program data.

The data-processing apparatus 10 can operate in a networked environment using logical connections to one or more remote computers (not shown). These logical connections are implemented using a communication device coupled to or integral with the data-processing apparatus 10. The data sequence to be analyzed can reside on a remote computer in the networked environment. The remote computer can be another computer, a server, a router, a network PC, a client, or a peer device or other common network node. FIG. 1 depicts the logical connection as a network connection 26 interfacing with the data-processing apparatus 10 through a network interface 28. Such networking environments are commonplace in office networks, enterprise-wide computer networks, intranets, and the Internet, which are all types of networks. It will be appreciated by those skilled in the art that the network connections shown are provided by way of example and that other means of and communications devices for establishing a communications link between the computers can be used.

Figure 2:
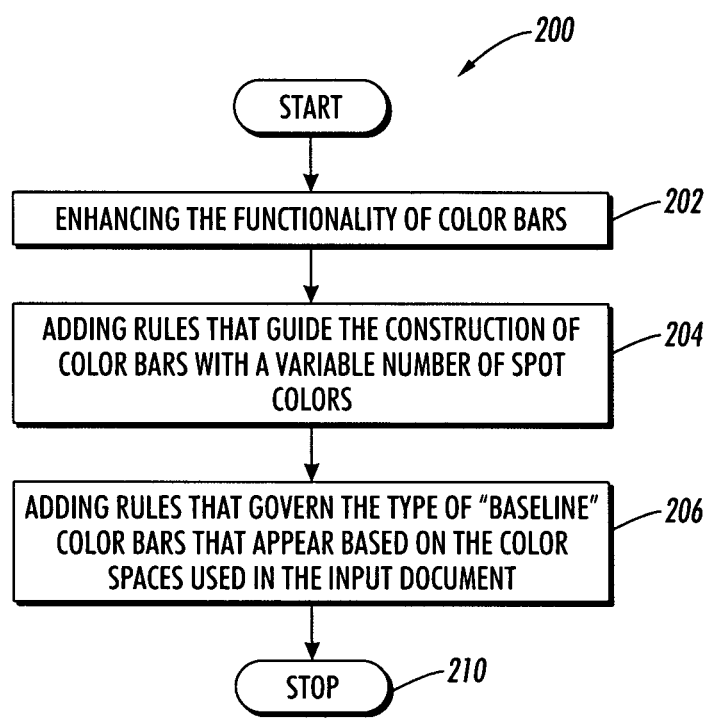
FIG. 2 illustrates a high-level flow chart of logical operational steps of a method for enhancing the functionality of color bars, in accordance with a preferred embodiment.

FIG. 2 illustrates a high-level flow chart of logical operational steps of a method 200 enhancing the functionality color bars, in accordance with a preferred embodiment. As indicated at block 202, the process begins. Next, as depicted at block 204, enhancing the functionality of color bars. Thereafter, as described at block 206, rules that guide the construction of color bars with a variable number of spot colors are added. Next, as indicated at block 208, rules that govern the type of "baseline" color bars that appear are added based on the color spaces utilized in the input document. Finally the process is completed as depicted at block 210.

Figure 3:
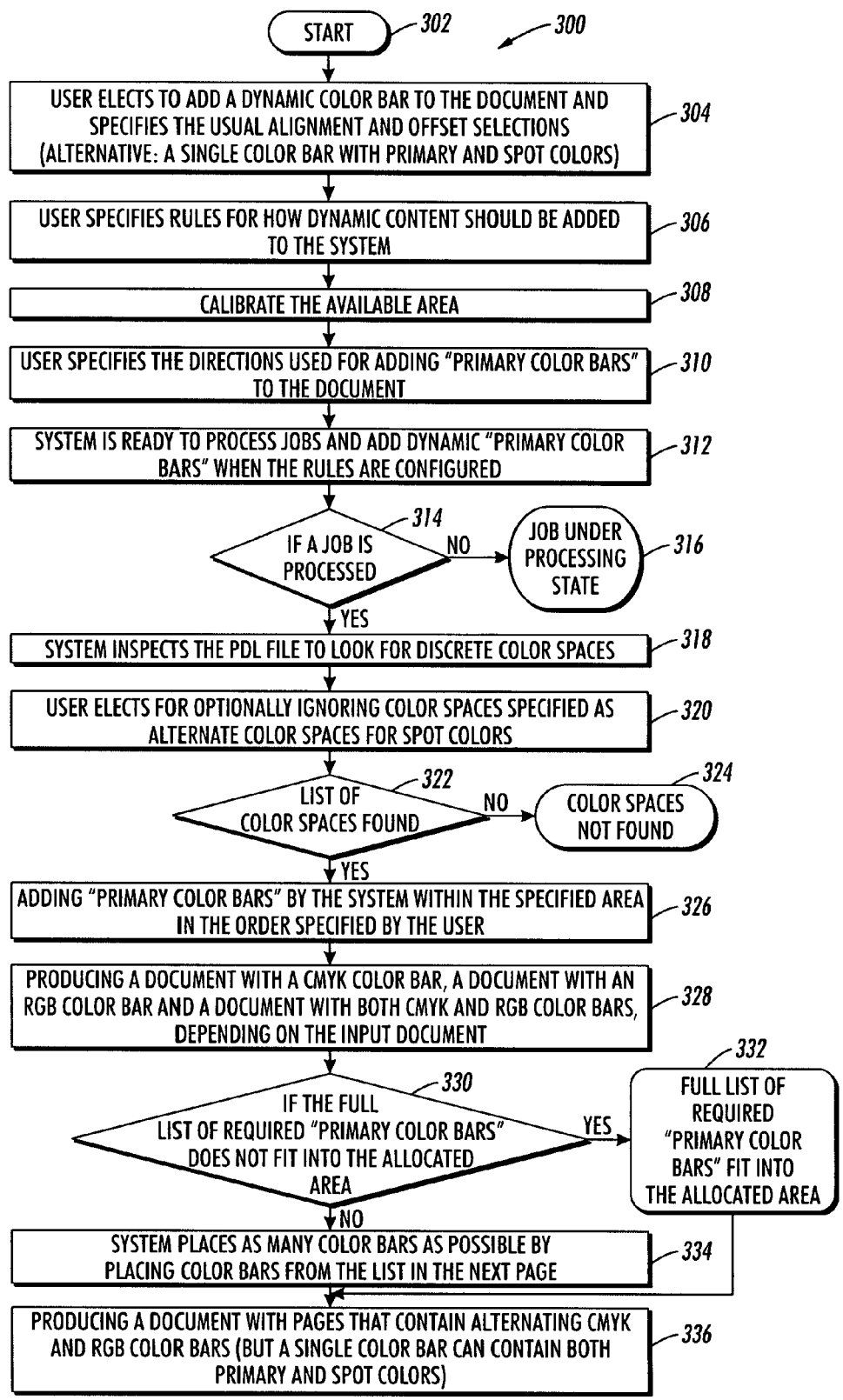
FIG. 3 illustrates a high-level flow chart of logical operational steps of a method for dynamically placing "primary colors" on a document based on the color spaces, in accordance with a preferred embodiment.

FIG. 3 illustrates a high-level flow chart of operations depicting a method for dynamically placing "primary colors" on a document based on the color spaces contained in the document, in accordance with a preferred embodiment. As indicated at block 302, the process begins. Next as depicted at block 304, user can elect to add a dynamic color bar to the document and specify the usual alignment and offset selections. Note that in some cases, as indicated optionally/alternatively at block 304, a single color bar with primary and spot colors may be utilized and in this particular case, such a single color bar can be processed according to the methodology described herein. The user can then specify rules for how dynamic content is added as indicated at block 306. Thereafter, as described at block 308, the available area can be calculated by "looking" outward and/or inward towards the boundaries of the document. Next, as depicted at block 310, the user can specify the placement intent used for adding "primary color bars" to the document. Note that when "looking outwards", the disclosed system and related methodology may "look" from a predefined PDL area to another predefined PDL area or to the perimeter of the PDL proper. Similarly when looking inwards, the system/methodology may look from a predefined PDL area or from the perimeter of the document inwards to another predefined PDL area or to the center of the document. Examples of predefined PDL areas are PDF trim, bleed and media boxes.

The system is then ready to process jobs and add dynamic "primary color bars when the rules are configured, as indicated at block 312. Next, as depicted at block 314, a test can be performed to determine if a job is being processed or is to be processed. If a job is processed, a PDL file can be inspected to identify discrete color spaces as indicated at block 318. Otherwise; the job is under processing stage as depicted at block 316. Thereafter, as described at block 320, the user can elect to optionally ignore color spaces specified as alternate color spaces for spot colors. Next, as depicted at block 322, a test can be performed to determine if a list of color spaces has been found. If so, then the process continues as indicated by the operation depicted at block 326. Otherwise, an indication that color spaces have not been found can be provided as illustrated at block 324.

The operation processed, as indicated at block 326, indicates that "primary color bars" can be added within a specified graphical display area in an order specified by the user. Thereafter, as described at block 328, a document with a CMYK color bar, a document with an RGB color bar and a document with both CMYK and RGB color bars, can be produced depending on the input document. Next, as depicted at block 330, a test can be performed to determine if the full list of required "primary color bars" does not fit into the allocated area. If the answer is "Yes" then as depicted at block 332, then it is determined that the full list of required "primary color bars" fits into the allocated area. Otherwise, as indicated at block 334 as many color bars as possible are placed in the same page and additional color bars in the next page as depicted at block 334. That is, if the full list of required "primary color bars" does not fit into the allocated area, the system will place as many color swatches as possible and commence placing color bars on the next page. It is important to note that in general, a "color bar" as the term is utilized herein refers essentially to a group of adjoining color swatches Finally, as indicated at block 336, a document is produced with pages that contain alternating CMYK and RGB color bars because only one color bar could fit into the designated area. Depending upon the input document, the same set of parameters may produce a document with a CMYK color bar, another document with an RGB color bar and yet another document with both CMYK and RGB color bars. Also note that, if one is creating a spot color bar, then a subset of spot colors may be present in each of multiple pages. Additionally, it is important to note, however, as indicated at block 336 that a single color bar can also contain both primary and spot colors, depending upon design considerations.

Figure 4:
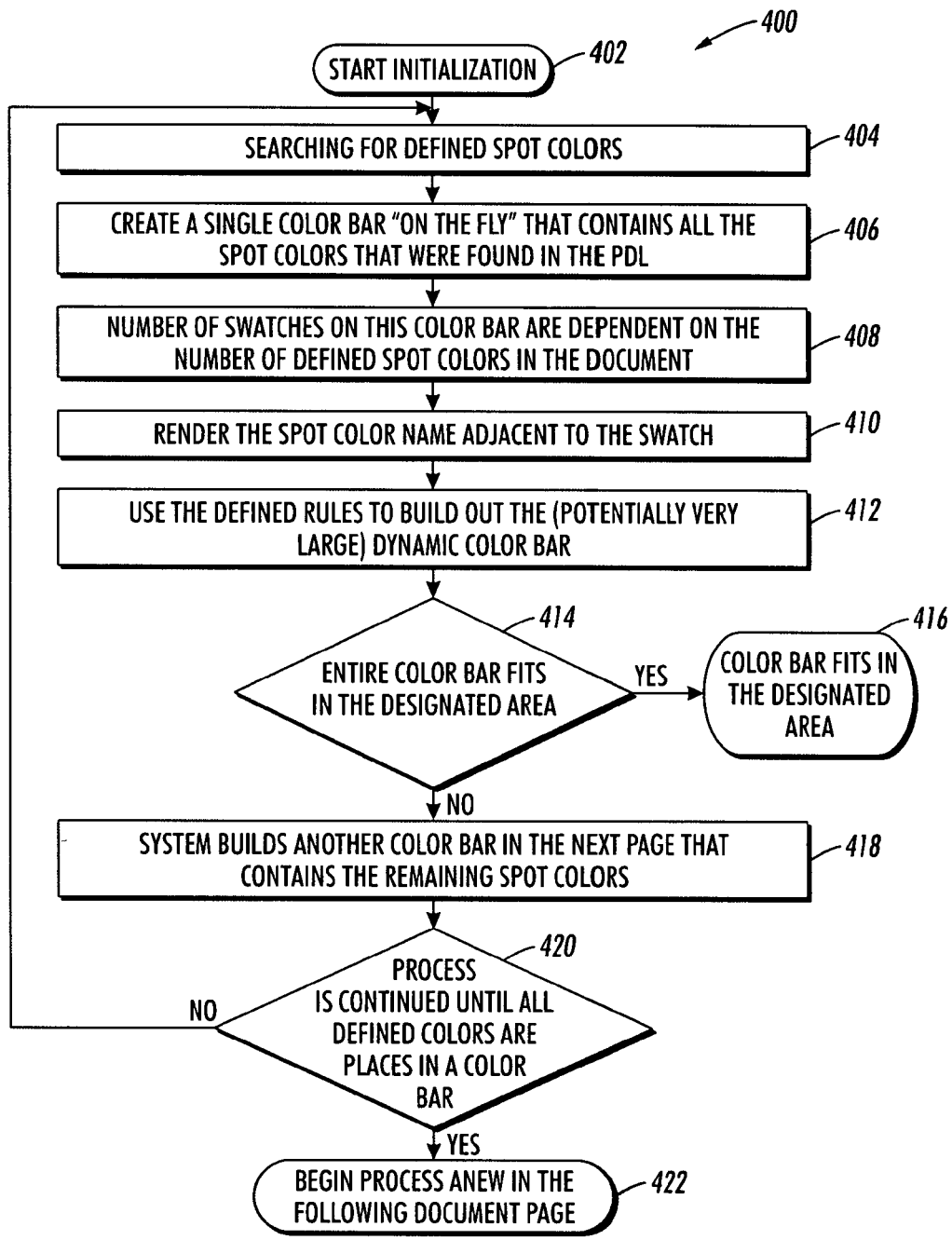
FIG. 4 illustrates a high-level flow chart of logical operational steps for creating dynamic color bars, in accordance with a preferred embodiment.

FIG. 4 illustrates a high-level flow chart of operations depicting a method 400 for creating dynamic color bars in accordance with a preferred embodiment. As indicated at block 402, the process begins. Next, as depicted at block 404, a search operation can be implemented for determining defined spot colors. Next, as indicated at block 406, an operation is processed in which a single color bar is created "on the fly" that contains all the spots that were found in the PDL. Thereafter, as depicted at block 408, an operation is processed in which the swatches on this color bar are dependent on the number of defined spot colors in the electronic document. Next, as indicated at block 410, the spot color name can be optionally rendered or printed adjacent to the swatch.

Defined color rules can then be utilized to build out the (potentially very large) dynamic color bar as depicted at block 412. Next as indicated at block 414, a test can be processed to determine if the entire color bar fits in the designated area. If the answer is "Yes" then as indicated at block 416, it is determined that the color bar fits in the designated area. Otherwise, as indicated block 418, another color bar can be constructed in the next page that contains the remaining spot colors. Process is continued until all defined colors are placed in a color bar as depicted at block 420. Finally as indicated at block 422, the process can begin again in the following document page.

Based on the foregoing, it can be appreciated that a number of benefits can accrue from implementing such embodiments. First, the specification of rules for content placement relative to an area determined during execution allows a single set of rules to apply to a wide variety of document dimensions. Such a feature is a key enabler for automation as it allows simplification of workflows. Second, the "primary color bars" can serve as a simple-to-use "preflight" report so that the user can view at a glance the color spaces utilized in a job without having to "pre-flight" the job. Third, creating color bars with all the defined spot colors can make it easier for the operator to determine whether spots were defined and that the DFE recognized the spot color call-out. Such a feature can serve as a very simple "pre-flight" operation for an inexperience operator.

It will be appreciated that variations of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A system of enhancing color bars utilized in color rendering applications, comprising:
   a data-processing apparatus;
   at least one module executed by said data-processing apparatus, said at least one module and said data-processing apparatus being operable in combination with one another to:
   specify rules for how dynamic content is added to a document;
   specify a placement intent for adding a plurality of primary color bars to a document;
   process the document to produce a PDL file;
   inspect said PDL file for discrete color spaces;
   identify defined spot colors within said document;
   provide an option to disregard those of said discrete color spaces specified as alternate color spaces for said spot colors;
   create said plurality of primary color bars containing swatches dependent on said defined spot colors;

calculate available area for a graphical display area within one page of the document by searching between a first predefined PDL area and a second predefined PDL area of the document;
configure said rules; and
add at least one of the plurality of primary color bars within the graphical display area of the document.

2. The system of claim 1 wherein said at least one of said plurality of primary color bars comprises a CMYK color bar.

3. The at least one module of claim 1 executed by said data-processing apparatus, said at least one module and said data-processing apparatus further being operable in combination with one another to specifying alignment and offset selections for the document.

4. The at least one module of claim 1 executed by said data-processing apparatus, said at least one module and said data-processing apparatus further being operable in combination with one another to determine whether all of the plurality of primary color bars will fit into the graphical display area of the document.

5. A program product, stored on one or more non-transitory computer-readable storage media, comprising instructions operable to cause a computer to:
determine defined spot colors within an electronic document;
create a single color bar containing all of the determined spot colors;
define color rules to build out a dynamic color bar;
calculate available area for a graphical display area within a first page of the document by searching between a first predefined PDL area and a second predefined PDL area of the document;
place the dynamic color bar within the graphical display area.

6. The program product of claim 5 further comprising:
compensating and adjusting said electronic document if said dynamic color bar does not fit within a specified graphical display area.

7. A computer implemented method of dynamically placing color bars on an electronic document to be rendered, comprising:
specifying rules for how dynamic content is added to the document, by executing a program instruction in a processing unit;
specifying a placement intent for adding a plurality of primary color bars to the document, by executing a program instruction in a processing unit;
processing the document to produce a PDL file, by executing a program instruction in a processing unit;
inspecting said PDL file for discrete color spaces;
identifying defined spot colors within said document;
providing an option to disregard those of said spaces specified as alternate color spaces for said spot colors;
creating said plurality of primary color bars containing swatches dependent on said defined spot colors;
calculating available area for a graphical display area within one page of the document by searching between a first predefined PDL area and a second predefined PDL area of the document, by executing a program instruction in a processing unit;
configuring said rules, by executing a program instruction in a processing unit;
placing at least one of the plurality of primary color bars within the graphical display area of the document, by executing a program instruction in a processing unit.

8. The method of claim 7 further comprising specifying alignment and offset selections for the document, by executing a program instruction in a processing unit.

9. The method of claim 8 further comprising determining whether all of the plurality of primary color bars will fit into the graphical display area of the document, by executing a program instruction in a processing unit.

10. The method of claim 9 further comprising inspecting said PDL file to identify discrete color spaces, by executing a program instruction in a processing unit.

11. The method of claim 10 further comprising performing a test to determine if discrete color spaces were identified, by executing a program instruction in a processing unit.

12. The method of claim 7 wherein the PDL areas comprise PDF trim, bleed boxes or media boxes, by executing a program instruction in a processing unit.

13. The method of claim 7 wherein said at least one of the plurality primary color bar comprises a CMYK color bar or an RGB color bar, by executing a program instruction in a processing unit.

* * * * *

UNITED STATES PATENT AND TRADEMARK OFFICE
CERTIFICATE OF CORRECTION

| | | |
|---|---|---|
| PATENT NO. | : 8,462,174 B2 | |
| APPLICATION NO. | : 11/714593 | |
| DATED | : June 11, 2013 | |
| INVENTOR(S) | : Javier A. Morales and Michael E. Farrell | |

It is certified that error appears in the above-identified patent and that said Letters Patent is hereby corrected as shown below:

Title Page:
Inventors (75): Please delete "Parrell" and insert therefore --Farrell--.

Signed and Sealed this
Thirtieth Day of July, 2013

Teresa Stanek Rea
*Acting Director of the United States Patent and Trademark Office*